United States Patent [19]
Olafsson

[11] Patent Number: 5,454,015
[45] Date of Patent: Sep. 26, 1995

[54] ADAPTIVE TIMING RECOVERY WITH GAIN ADJUSTMENT

[75] Inventor: Sverrir Olafsson, Seltjarnarnes, Iceland

[73] Assignee: Rockwell International Corporation, Seal Beach, Calif.

[21] Appl. No.: 283,727

[22] Filed: Aug. 1, 1994

[51] Int. Cl.[6] .................................................. H04L 27/08
[52] U.S. Cl. ........................................ 375/345; 455/234.1
[58] Field of Search ............................. 375/326, 327, 375/345; 342/92; 455/232.1, 234.1, 245.1, 250.1; 348/528

[56] References Cited

U.S. PATENT DOCUMENTS

| | | | |
|---|---|---|---|
| 4,910,467 | 3/1990 | Leitch | 375/98 |
| 5,131,009 | 7/1992 | Janer | 375/98 |

Primary Examiner—Young Tse
Attorney, Agent, or Firm—George A. Montanye; David J. Arthur; Philip K. Yu

[57] ABSTRACT

An adaptive timing recovery method and apparatus are disclosed. The present invention reduces the problems in connection with the conventional timing recovery by varying the gain of the band-edge filtering in inverse proportion to the available band-edge energy in the received signal. The non-linearized outputs from the "early-late" filter are first added together and then subtracted from a reference value. A small fraction of the result is subtracted from the filter gains of the two half-symbol-rate filters. Therefore, if the band-edge energy is small, then the sum of the non-linearized outputs is negative and the timing filter gain values are increased. If the band-edge energy is large, then the filter gains will be reduced.

7 Claims, 4 Drawing Sheets

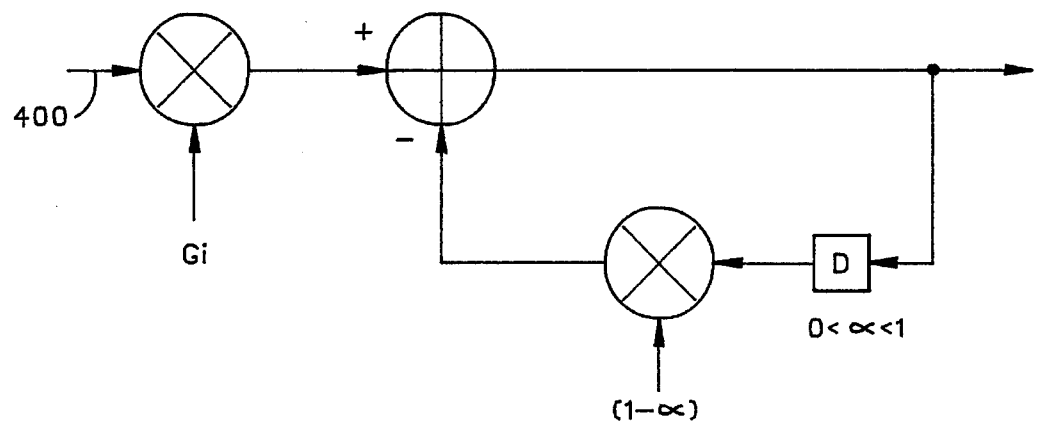
*FIG. 4-BPF*
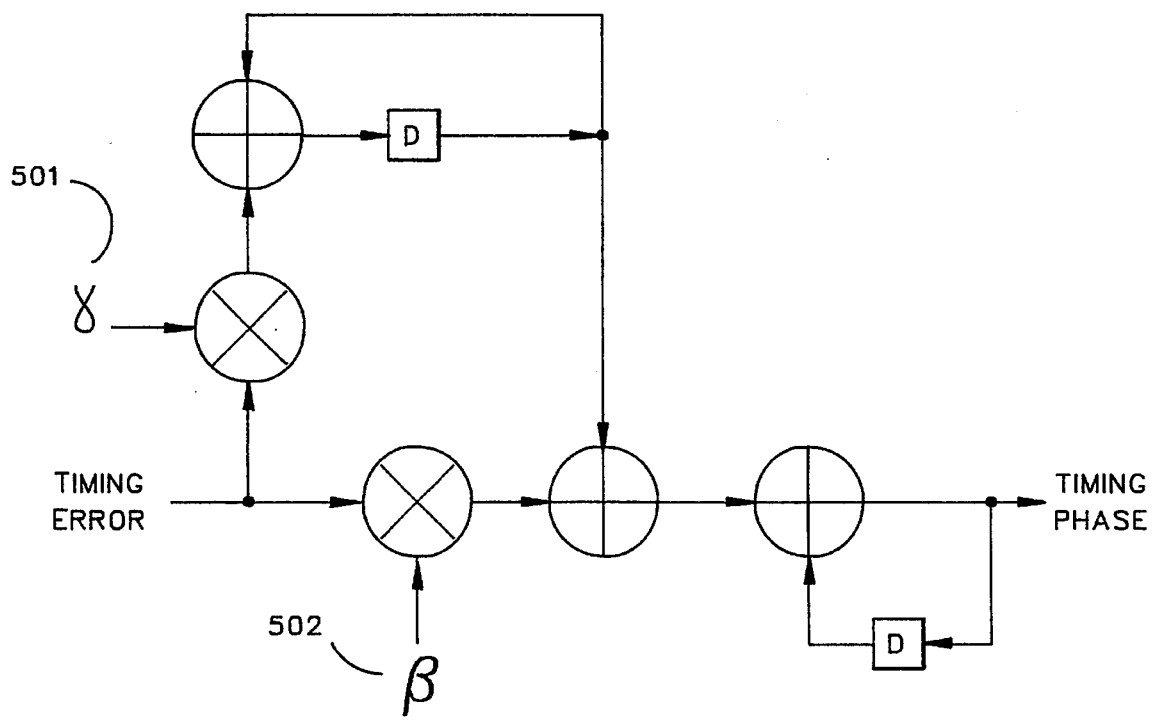
*FIG. 5-PLL*

ADAPTIVE TIMING RECOVERY WITH GAIN ADJUSTMENT

FIELD OF THE INVENTION

The present Invention relates to telecommunication and more specifically to data transmission over telephone and wireless channels.

BACKGROUND OF THE INVENTION

As data are transmitted through telephone or wireless channels, the receiver must be able to detect the timing information in the received signal to synchronize its clocks to the data. A conventional timing recovery system on the receiver's end for use in connection with data communication is shown in FIG. 1. The received signal 10 is first applied to a nonlinearity operator, such as the squarer 12. The output from the square 12 is then filtered by a narrow-band filter or a phase-locked loop 14 to retrieve the desired timing signal. The recovered timing signal can thus to be used to facilitate the sampler on the receiver's end to receive data. The conventional system generally fails to optimize the timing phase.

FIG. 2 illustrates another conventional timing recovery system, commonly referred as the "Early-Late" system, for optimizing the timing phase and frequency for synchronizing data receivers. A received signal 21 from a sampler 20 has samples in different phases (represented by Phase A and Phase B). The signal in one phase is filtered by a half-symbol-rate band-pass filter 22 to produce an EARLY sample, while the signal in another phase is filtered by another half-symbol-rate band-pass filter 23 to produce a LATE sample. The filtered signals are then applied to a nonlinearity operator, such as the squarers 24, 25, to generate their squared symbol components. A difference between the squared outputs is generated by an adder 26 as an error signal.

The error signal can then be applied to a timing phase-locked loop 27 to recover a timing signal 28 for the sampler 20 to synchronize the received signal. When the received signal is synchronized, the error signal should be zero. When such a situation occurs, the phase-locked loop 27 will settle to one unique phase, which is thus the optimal timing sampling phase for a T-spaced equalizer. This technique is commonly called the "band-edge component maximization" technique in that it uses the band-edge energy in the received signal to track timing. The general goal is to keep the two samples, EARLY and LATE, roughly equal to derive their optimal sampling time, which is generally half-way between the two samples.

There are problems associated with the conventional "Early-Late" technique. Because information at the band-edge is often heavily attenuated by the channel, there is very little energy, i.e. little information, at the band-edge for the timing circuit. The tracking range of the phase-locked loop depends on the channel, e.g. too high for high bandedge gain and too low for low gain.

SUMMARY OF THE INVENTION

An adaptive timing recovery method and apparatus are disclosed. The present invention reduces the problems in connection with the conventional timing recovery by varying the gain of the band-edge filtering in inverse proportion to the available band-edge energy in the received signal. The nonlinearized outputs from the "early-late" filter are first added together and then a reference value is subtracted. A small fraction of the result is subtracted from the filter gains of the two half-symbol-rate filters. As such, if the band-edge energy is small, then the sum of the nonlinearized outputs is small and only a very small amount is subtracted from the timing filter gain values. If the band-edge energy is large, then the filter gains will be reduced.

The present invention overcomes at least one of the problems of the conventional technique by changing the gain of the timing PLL which is effectively an adaptive filter. Thus, in a simple manner, a timing error signal is generated whose gain is independent of the channel, resulting in a constant tracking range.

BRIEF DESCRIPTION OF THE DRAWINGS

Additional objects, features and advantages of the present invention will be disclosed in the following description, wherein:

FIG. 4 illustrates a bandpass filter to be implemented with the present invention.

FIG. 5 illustrates a phase-locked loop to be implemented with the present invention.

DETAILED DESCRIPTION OF THE DRAWINGS

An adaptive timing recovery system with gain adjustment is disclosed. In the following description, although a system diagram and a flow chart are described, it should be apparent to those skilled in the art that the present invention is not limited to any specific hardware components. Nor is the implementation of the present invention limited to any particular form of computer programming language.

Figure 1:
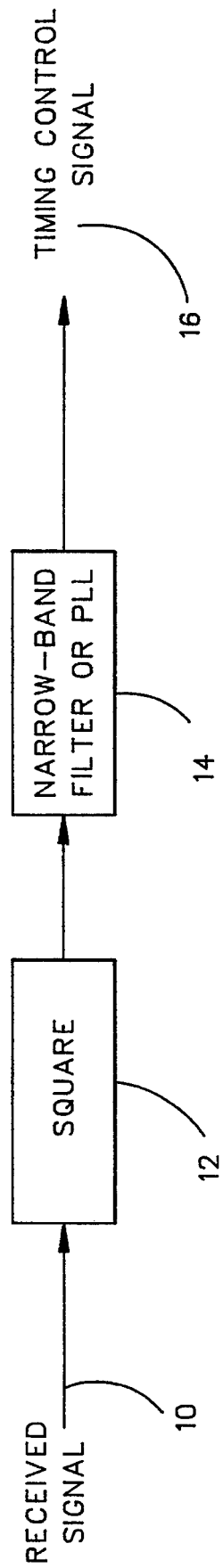
FIG. 1 is the simplified diagram of a conventional timing recovery system on the receiver's end of a data communication system.
Figure 2:
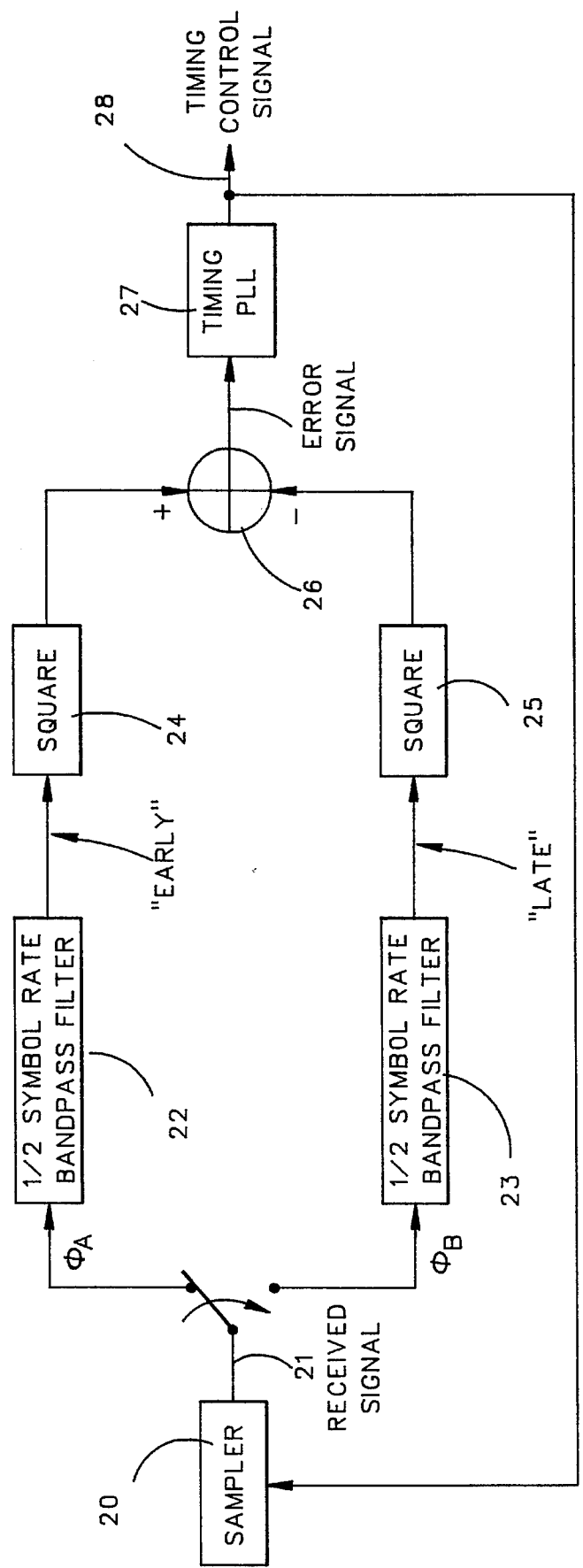
FIG. 2 is the system block diagram of an "early-late" timing recovery system for implementation with the present invention.
Figure 3:
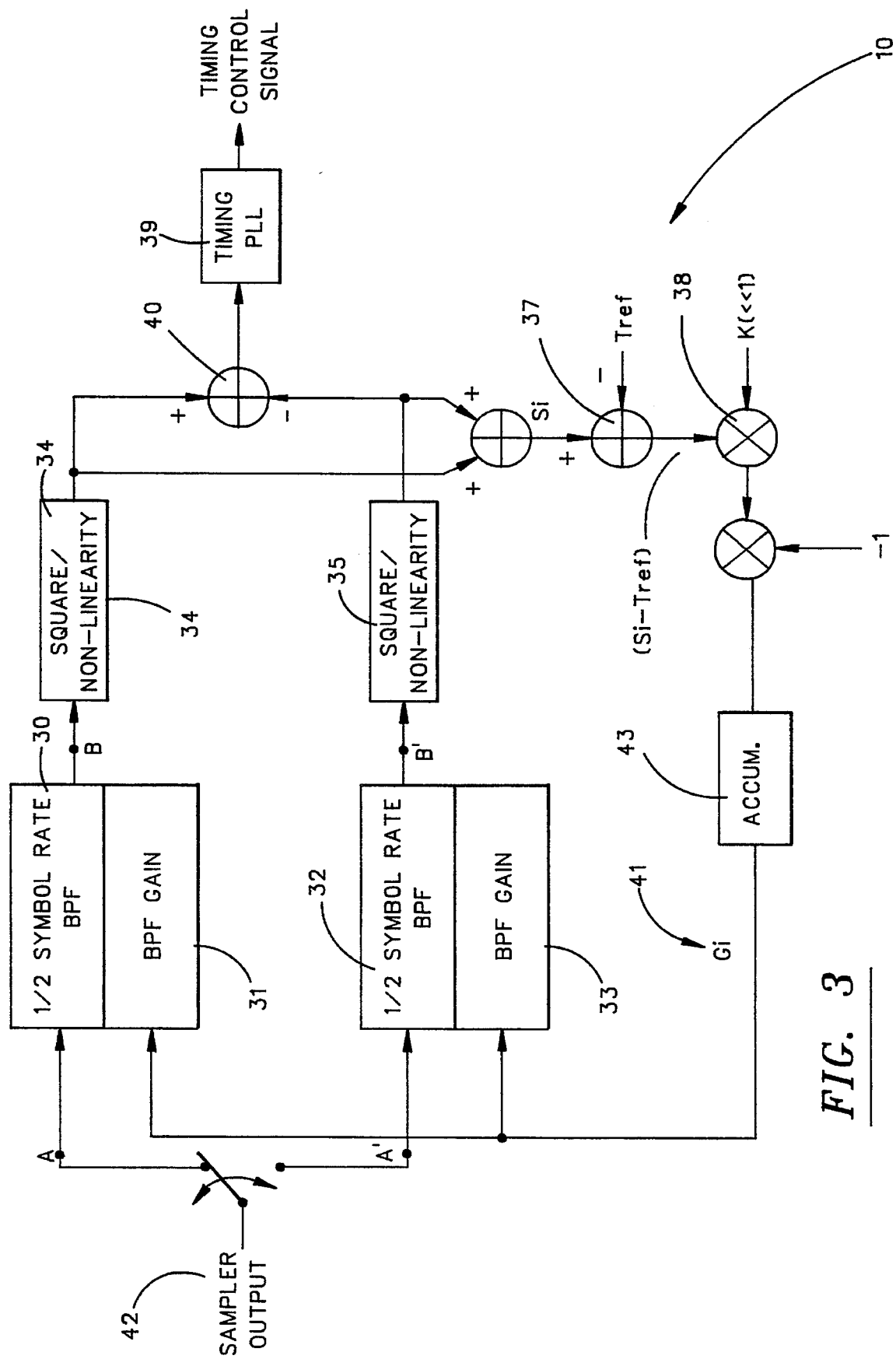
FIG. 3 is the system block diagram of an adaptive timing recovery system in accordance with the present invention.

Referring to FIG. 3, a system block diagram of the present invention is shown. The sampler output 42 at 2-times the symbol rate is alternately applied to BPF's 30 and 32, which receive their respective inputs at the symbol rate. To improve the performance of the band-pass filters (BPF), a BPF gain unit is implemented to adjust the gain of the received samples in response to the signal level at the adder 36. With a controlled gain, the timing PLL 39, acting effectively as a filter, functions dynamically the same for different channels.

As shown in FIG. 3, the outputs from the squarers 34, 35 (or any non-linear operator giving an output generally in proportion to the signal power at input) are added by an adder 36 to generate a sum $S_i$ and a reference level, $T_{ref}$, subtracted to produce a signal equal to $(S_i - T_{ref})$, which indicates whether the timing recovery gain needs to be increased or decreased. The $(S_i - T_{ref})$ signal is then multiplied by a multiplication factor K, a value much less than 1, and its negative accumulated by an accumulator 43 to generate a gain factor, $G_i$, 41 for adjusting the BPF gain 31, 33. If the gain factor, $G_i$, 41 at time "i" is represented by G(i), then the gain at time i can be expressed as:

$$G_i = G_{i-1} - (S_i - T_{ref})K,$$

where K is much less than 1.

It should be noted that the gain factor 41, $G_i$, may be implemented anywhere between node A, A' and nodes B and B'. An example may be to apply the gain factor Gi to the input signals to the BPF's 30, 32 at nodes A and A'. The gain of the band-edge filtering can thus be varied in inverse proportion to the available band-edge energy in the received signal 42. As such, if the band-edge energy is small, then the sum of the squarer outputs at the adder 36 is small, which thereafter increases the BPF gains 31, 33 by a small amount. If the band-edge energy is large, i.e. less attenuation, then the filter gains 31, 33 will be reduced.

FIG. 4 graphically illustrates a bandpass filter which can be implemented with the timing recovery system of the present invention. Note that the gain factor $G_i$, which is normally a fixed multiplication factor for the bandpass filter, is multiplied to the received sampled signal 400. The gain-adjusted sampled signal is then subtracted by a scaled feedback, where α (the pole position in a z-transform plane) is between 0 and 1 (generally less than 0.1). Note that α and $G_i$ can be complementarily designed by those skilled in the art in implementing their filters.

FIG. 5 graphically illustrates a phase-locked loop to generate the timing phase signal from the timing error signal. Note that the gain factors 501, 502 can be complementarily designed by those skilled in the art in implementing their desired filters.

What is claimed is:

1. An adaptive timing recovery system with gain adjustment for recovering a timing control signal from a received sampled signal, comprising:

a first half-symbol-rate bandpass filter means for filtering said received sampled signal in a first phase;

a second half-symbol-rate bandpass filter means for filtering said received sampled signal in a second phase;

a first non-linearity means coupled to said first filter means to generate a first signal;

a second non-linearity means coupled to said second filter means to generate a second signal;

adder means for adding said first and second signals to generate a third signal;

subtracter means for subtracting a predetermined reference from said third signal to generate a fourth signal;

scaling means for scaling the fourth signal according to a predetermined multiplication factor;

accumulator means coupled to said scaling means for accumulating the scaled fourth signal to generate a gain factor $G_i$;

gain control means coupled to said first and second filter means for applying said gain factor $G_i$ to said first and second filter means in their filtering of said received sampled signal in said first and second phases, respectively;

difference means coupled to said first and second non-linearity means for generating a difference signal between said first and second signals;

timing phase-locked loop means coupled to said difference means for receiving said difference signal to recover said timing control signal.

2. An adaptive timing recovery system according to claim 1, wherein said first and second non-linearity means comprise a squarer operator.

3. An adaptive timing recovery system according to claim 1, wherein:

said gain control means multiplying said received sampled signal by said gain factor $G_i$ before said received sampled signal is filtered by said first and second bandpass filter means.

4. An adaptive timing recovery system for recovering a timing control signal from a received sampled signal, comprising:

half-symbol-rate bandbass filter means for filtering said received sampled signal in a first and second phases with respective predetermined gains;

first and second non-linearity means coupled to said filter means for non-linearizing the outputs in said first and second phases from said filter means;

difference means coupled to the outputs of said first and second non-linearity means for generating a difference signal between the outputs;

timing phase-locked loop means for generating said timing control signal based on said difference signal from said difference means;

adder means coupled to said first and second non-linearity means for generating a sum $S_i$ of the outputs from said first and second non-linearity means;

reference means coupled to said adder means for subtracting a predetermined reference value $T_{ref}$ from said sum $S_i$ to generate a $(S_i - T_{ref})$ signal;

scaling means coupled to said reference means for scaling said $(S_i - T_{ref})$ signal from said reference means by a predetermined factor K;

accumulator means coupled to said scaling means for accumulating the negative of the scaled $(S_i - T_{ref})$ signal from said scaling means to generate a gain factor $G_i$, where $G_i = G_{i-1} - (S_i - T_{ref})K$; and gain control means for applying the gain factor $G_i$ to said filter means to adjust said respective predetermined gains in its filtering of received sampled signal in said first and second phases.

5. An adaptive timing recovery system according to claim 4, wherein:

said filter means comprises a first and second half-symbol-rate bandpass filter (BPF) means for generating said first and second phases, respectively;

said gain control means applying the gain factor $G_i$ to the received sampled signal prior to said first and second BPF means to adjust their outputs in said first and second phases.

6. A method of recovering a timing control signal from a received sampled signal comprising a plurality of phases, comprising the steps of:

applying alternately said received sampled signal to a first and second half-symbol-rate band-pass filters to generate an early signal and a late signal;

squaring said early and late signals;

determining the difference between the squared early and late signals;

summing the squared early and late signals to generate a sum $S_i$;

subtracting the sum $S_i$ of the squared early and late signals by a predetermined reference value $T_{ref}$ to generate a $(S_i - T_{ref})$ signal;

scaling said $(S_i - T_{ref})$ signal by a predetermined factor K to generate a $(S_i - T_{ref})K$ signal;

accumulating the negative of said $(S_i - T_{ref})K$ signal to a gain factor $G_i$;

applying the gain factor to said first and second band-pass filters to adjust the early and late signals;

applying said difference between the squared early and late signals to a timing phase-locked loop to recover said timing control signal.

7. A method according to claim 6, wherein the step of applying the gain factor to said first and second band-pass filters comprises multiplying said received sampled signal by said gain factor $G_i$ prior to filtering said received sampled signal.

* * * * *